United States Patent [19]

Kakihara

[11] Patent Number: 4,476,370
[45] Date of Patent: Oct. 9, 1984

[54] METHOD AND APPARATUS FOR SHAPING BEADS OF WELDED STEEL SECTION

[75] Inventor: Moriyuki Kakihara, Chiba, Japan

[73] Assignee: Sumitomo Metal Industries, Ltd., Osaka, Japan

[21] Appl. No.: 348,312

[22] Filed: Feb. 11, 1982

[51] Int. Cl.³ .............................................. B23K 31/08
[52] U.S. Cl. ................................. 219/78.16; 219/105; 228/125; 228/110
[58] Field of Search ...................... 219/91.23, 102, 105, 219/107, 78.16, 81, 82; 228/110, 125, 141.1, 144

[56] References Cited

U.S. PATENT DOCUMENTS

| | | | |
|---|---|---|---|
| 2,892,921 | 6/1959 | Mecklenborg | 219/102 X |
| 3,410,982 | 11/1968 | Morris et al. | |
| 3,523,513 | 8/1970 | Maier et al. | 219/61.3 X |
| 3,588,426 | 6/1971 | Harriau et al. | 219/105 X |

FOREIGN PATENT DOCUMENTS

| | | | |
|---|---|---|---|
| 40774 | 12/1970 | Japan . | |
| 455834 | 2/1975 | U.S.S.R. | 228/125 |
| 491451 | 2/1976 | U.S.S.R. | 228/125 |

OTHER PUBLICATIONS

Cary, Howard B., Modern Welding Technology, 1979, p. 539.

*Primary Examiner*—Roy N. Envall, Jr.
*Assistant Examiner*—C. M. Sigda
*Attorney, Agent, or Firm*—Burns, Doane, Swecker & Mathis

[57] ABSTRACT

In manufacturing steel sections by high-frequency resistance welding, weld beads are produced along the weld line of the material. However, rolls disposed in the neighborhood of the welding end point squeeze the red-hot weld beads into a uniform shape.

3 Claims, 16 Drawing Figures

METHOD AND APPARATUS FOR SHAPING BEADS OF WELDED STEEL SECTION

BACKGROUND OF THE INVENTION

The present invention relates to a method and an apparatus for shaping beads of a steel section and, more particularly, to a method and an apparatus for shaping weld beads of a steel section such as an H-beam, T-beam and the like, manufactured by high-frequency resistance welding.

In a welded H-beam or a welded T-beam manufactured by welding a web strip and flange strips by high-frequency resistance welding, beads are usually produced as projections in the welded zone, while such weld beads have no affect upon the strength of the steel section itself, they are preferably removed or shaped because they spoil the appearance and may cause rusting even when coated.

Heretofore, the weld beads were removed or shaped by any oF the following methods:

(1) Cutting out of the bead by a cutting tool

While this method was most commonly employed, it had disadvantages such as high equipment cost, instability in cutting condition, necessity for disposal of chips, and short life of the cutting tool.

(2) Squeezing of the red-hot beads by an air hammer (disclosed by Japanese patent public disclosure No. 30362/1980).

This method had disadvantages such as high equipment cost and difficulty in synchronizing the hammer operation with the feed rate of the material.

(3) Scarfing of the red-hot beads by blowing oxygen gas (disclosed by Japanese patent public disclosure No. 116784/1980).

This method had disadvantages such as high operation cost, splashes of blown slag, and instability in the rate of scarfing.

SUMMARY OF THE INVENTION

Accordingly, an object of the present invention is to provide a method and an apparatus for shaping weld beads of a welded steel section, capable of eliminating hitherto existing technical disadvantages, low in cost, high in performance, and stable in the quality of the finished products.

In the method and the apparatus according to the present invention, the weld beads in a red-hot condition are squeezed by undriven rolls to uniformalize the projections of the beads along the weld line into the desired shape without damaging the quality of the products.

In the present invention, bead shaping rolls are arranged either in a mutually staggered relationship on the downstream side of the welding end point with respect to the direction of advancement of the material or in a line passing through the welding end point. In the former arrangement, pressure rolls urging flange strips against the web strip and support rolls supporting the web strip are arranged in the line passing through the welding end point. In the latter arrangement, a web support guide is used in place of the web support rolls supporting the web strip, and the web support guide, the pressure rolls and the bead shaping rolls are arranged in the line passing through the welding end point.

BRIEF DESCRIPTION OF THE DRAWINGS

The present invention will be better understood from the following description taken in connection with the accompanying drawings in which.

DESCRIPTION OF THE PREFERRED EMBODIMENTS

Figures 1, 2:
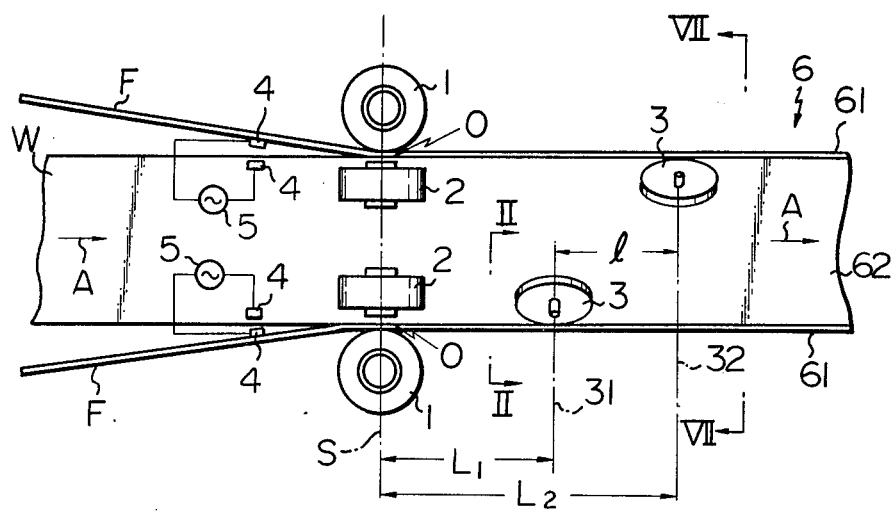
FIG. 1 is a schematic illustration of an example of practice of the method according to the present invention.
FIG. 2 is an enlarged partial view of the welded zone of the H-beam viewed from the line II—II of FIG. 1.

With reference first to FIG. 1, an example of practice of the method according to the present invention will be described, in which bead shaping rolls are arranged in a mutually staggered relationship on the downstream side of the welding end point with respect to the direction of advancement of the material. FIG. 1 shows a schematic construction of the H-beam welding line according to the present invention in the neighborhood of the welding end point. A web strip W standing on a side thereof is advanced in the direction of an arrow A. Flange strips F are advanced along the upper and the lower edge thereof, respectively, in the direction of the arrow A. In the range from the welding start point to the welding end point O, pressure rolls 1 and support rolls 2 are arranged substantially in the same straight line. Bead shaping rolls 3 are arranged in a mutually staggered relationship on the downstream side of the welding end point O with respect to the direction of advancement of the material. The bead shaping rolls 3 are arranged symmetrically with the web strip W therebetween. The straight line passing through the welding end point is denoted by S, then the distance from the straight line S to the axis 31 of one roll 3 is denoted by $L_1$, the distance from the straight line S to the axis 32 of the other roll 3 is denoted by $L_2$, and the distance between the axes 31 and 32 is denoted by l.

The pressure rolls 1 urge the flange strips F against the edges of the web strip W. The bead shaping rolls 3 engage with the welded zones between the web strip W and the flange strips F at an angle of inclination $\theta$ with respect to the flange strips F to shape beads produced in the welded zones. The web support rolls 2 pressingly engage with opposite sides of the web strip W to support it and to prevent buckling of the strip.

In electric resistance welding, as shown in FIG. 1, electrodes 4 are brought into contact with the web strip W and the flange strips F on the upstream side of the welding end point O with respect to the direction of advancement of the material, a high frequency current is passed from a source of high frequency current 5 to the strips to heat them locally to a temperature in the range 1500°–1600° C., and the flange strips F are pressure-welded to the edges of the web strip W by the pressure rolls 1. The red-hot beads produced during the pressure welding are shaped by the bead shaping rolls 3. In this way, an H-beam 6 having flanges 61 and a web 62 is formed continuously.

Figure 3:
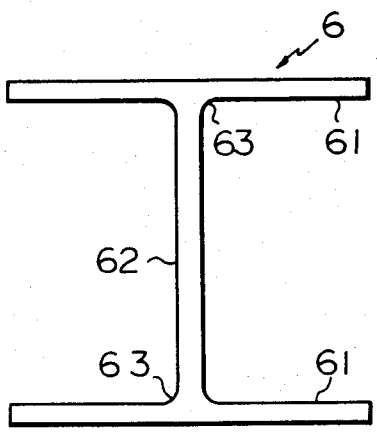
FIG. 3 is a sectional view of the welded H-beam obtained by the method according to the present invention.

As shown in FIG. 2, the bead shaping rolls 3 engage with red-hot beads B at the angle of inclination $\theta$ with respect to the flange 61 of the H-beam 6 to squeeze the beads B and to shape them into a smooth curved surface 63 of a curvature R. FIG. 3 shows a section of the H-beam with the weld bead shaped in the way described above. Shaping results of the weld beads will be described in detail hereinunder with reference to FIG. 14C.

Figure 4:
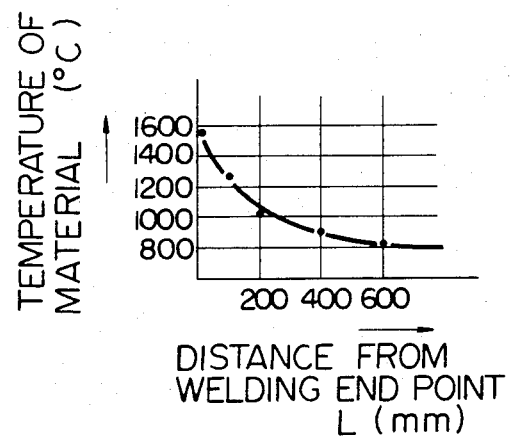
FIG. 4 is a diagramatic illustration of the relationship between the temperature of the material after welding and the distance from the welding end point.

The angle of inclination $\theta$ of the bead shaping rolls 3 is preferably in the range 30°–60° C. The bead shaping rolls 3 are positioned preferably in the range through which the weld beads pass still in red-hot state (above approximately 800° C.) after the end of welding. In view of the life of the rolls, however, the range mentioned above is preferably such that the temperature of the beads is lower than 1000° C. FIG. 4 shows the results of experiments for determining the optimum positions of the bead shaping rolls 3. As seen from FIG. 4, the distances $L_1$ and $L_2$ of the bead shaping rolls 3 from the straight line S through the welding end point O are preferably in the range 200–400 mm. The bead shaping rolls 3 provided on the upper and lower edge of the web strip are preferably spaced horizontally from each other by a small distance l to thereby simplify the construction of their fittings and facilitate their installation.

The bead shaping rolls 3 are not necessarily large in size but may be as small as 50–80 mm in diameter. As shown in FIG. 2, the periphery of the bead shaping roll 3 may be of a substantially arcuate form having such a radius, for example R=5–10 mm, that the weld beads B are rolled along the weld fillet when squeezed. Further, the bead shaping rolls 3 are preferably of a heat- or wear-resistant material such, for example, as high manganese steel casting of JIS-G5 131 or valve steel of JIS-G4 302.

Another example of practice of the method according to the present invention in which the bead shaping rolls are arranged in the line passing the welding end point O will now be described with reference to FIG. 5. In this example, the pressure rolls 1, the bead shaping rolls 3, and web support guides 2a are arranged substantially in a straight line passing the welding end point O. In this example, the web support guides 2a are employed in place of the support rolls 2. The web support guides 2a are in face-to-face contact with the web strip W. In other respects, the example of FIG. 5 is identical to that of FIG. 1.

Figure 5:
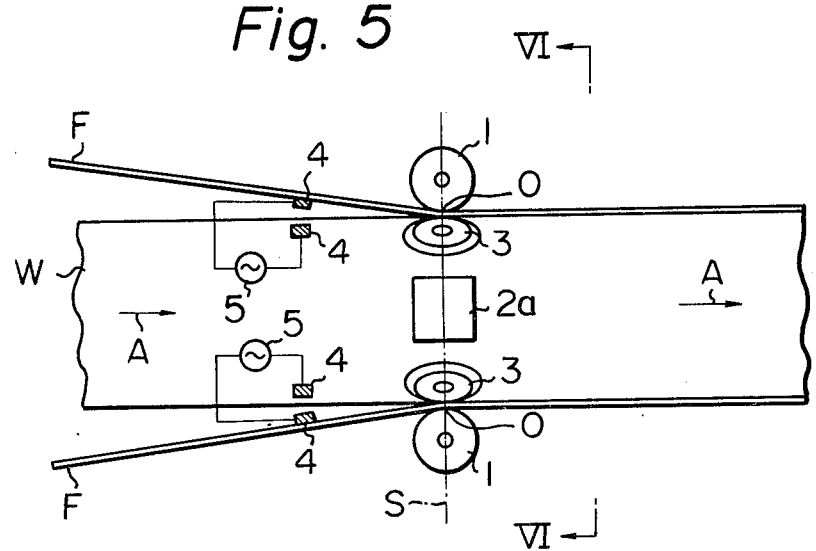
FIG. 5 is a schematic illustration of another example of practice of the method according to the present invention.
Figure 6:
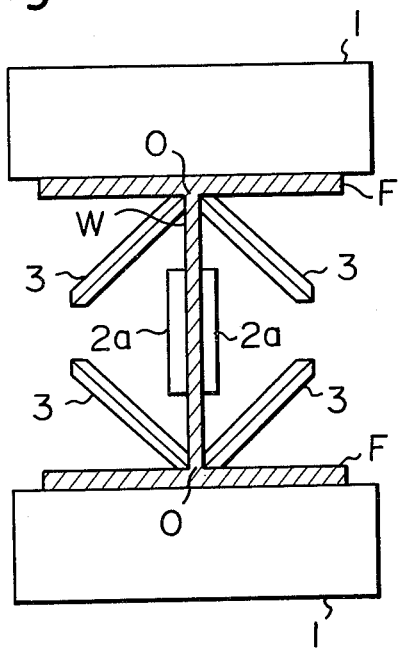
FIG. 6 is a front view from the line VI—VI of FIG. 5.

In the example of FIG. 5, the pressure rolls 1 urge the flange strips F against the edges of the web strip W as shown in FIG. 6. The bead shaping rolls 3 engage with the welded zones between the web strip W and the flange strips F to shape the beads produced in the welded zones. The web support guides 2a engage in pressure with the opposite sides of the web strip W to support it and to prevent buckling of the strip.

The red-hot beads produced during the pressure welding are shaped by the shaping rolls 3 simultaneously in the welded zones.

The apparatus for carrying out the method according to the present invention will now be described.

Figure 7:
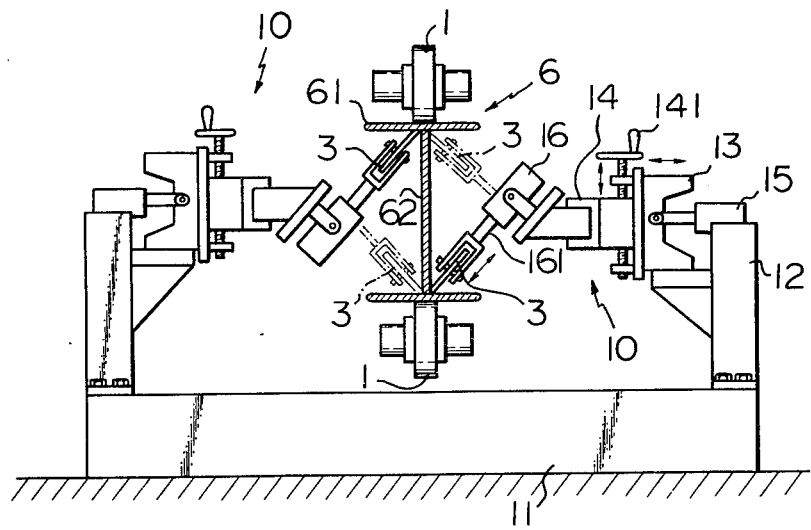
FIG. 7 is a front view from the line VII—VII of FIG. 1.

With reference first to FIG. 7, the apparatus for carrying out the method shown in FIG. 1 will be described in detail. FIG. 7 shows only a support mechanism 10 of a pair of the bead shaping rolls 3 for convenience of description.

As shown in FIG. 7, the bead shaping rolls 3 are supported adjustably movably in horizontal and vertical directions by the support mechanism 10. The support mechanism 10 comprises a base 11, support frames 12, horizontally movable blocks 13, vertically movable blocks 14, first hydraulic cylinders 15, and second hydraulic cylinders 16. The support frames 12 are fixed upright at opposite ends of the base 11. The horizontally movable blocks 13 are supported horizontally slidably by the support frames 12 and are moved by the first hydraulic cylinders 15 fixed to the support frames 12. The vertically movable blocks 14 are supported vertically slidably by the horizontally movable blocks 13 and are vertically moved by turning a handle 141. The second hydraulic cylinders 16 are attached angularly adjustably to the vertically movable blocks 14. The bead shaping rolls 3 are attached rotatably to the forward ends of piston rods 161.

The bead shaping rolls 3 are urged against the weld beads at a desired angle by suitably adjusting the first hydraulic cylinders 15, the second hydraulic cylinders 16, and the handle 141.

The hydraulic cylinders 15 and 16 may be substituted with compression springs.

The apparatus for carrying out the method shown in FIG. 6 will then be described in detail with reference to FIGS. 8 to 13.

Figure 8:
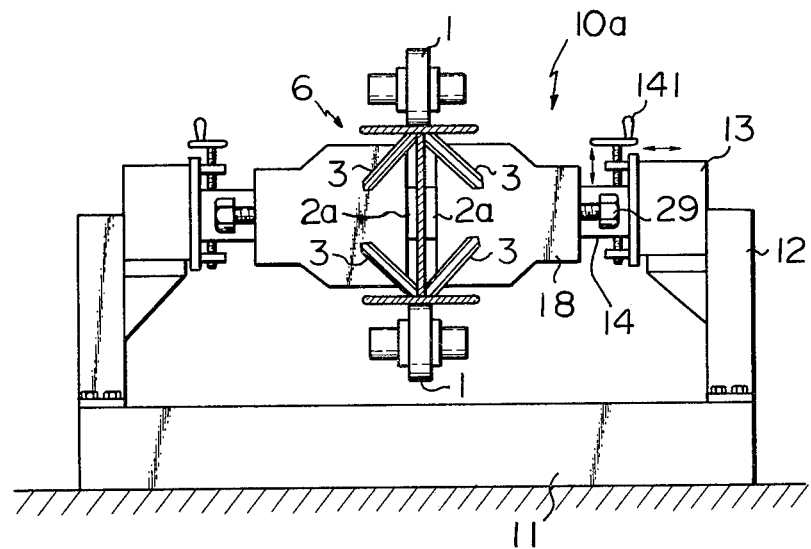
FIG. 8 is a front view of another embodiment of the apparatus according to the present invention.

As shown in FIG. 8, the bead shaping rolls 3 are supported adjustably movably in horizontal and vertical directions by a support mechanism 10a.

The support mechanism 10a is of the identical construction to the support mechanism 10 described hereinabove except in that the first hydraulic cylinders 15 and the second hydraulic cylinders 16 are not included in the support mechanism 10a. Holders 18 are attached to the vertically movable blocks 14. The bead shaping rolls 3 are urged against the weld beads at a desired angle by suitably adjusting the handles 141 and bolts 29 which will be described hereinunder.

Figure 9:
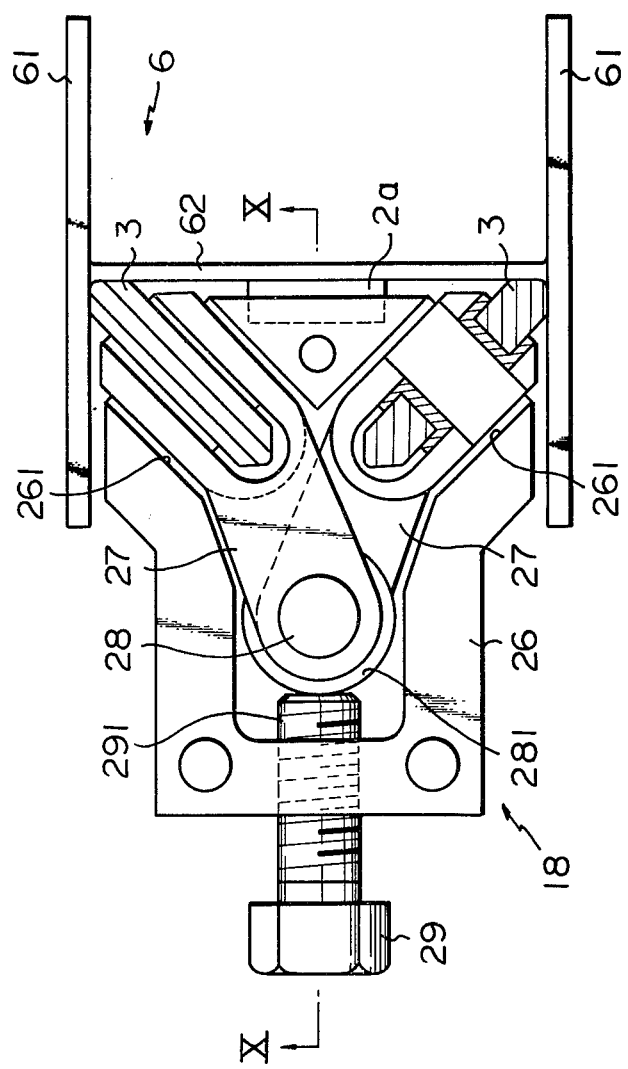
FIG. 9 is a front view of a holder used in the apparatus according to the present invention.
Figure 10:
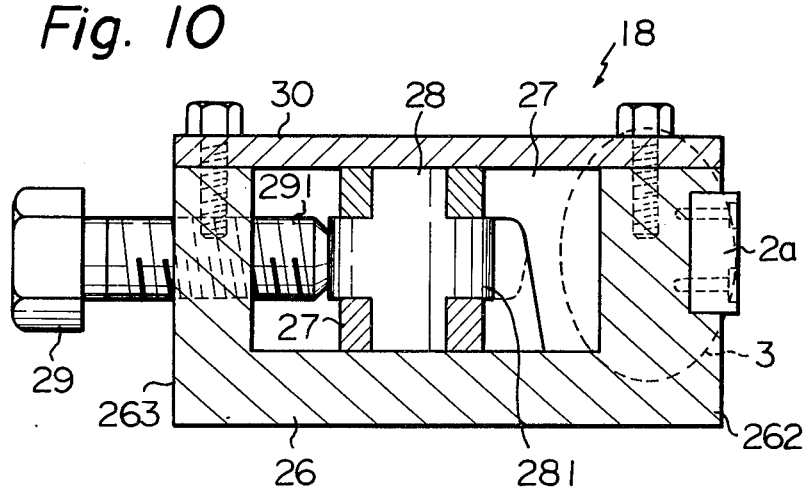
FIG. 10 is a sectional view taken along the line X—X of FIG. 9.

The holders 18 to be used in the apparatus according to the present invention will now be described with reference to FIGS. 9 to 13. The holder 18 comprises basically a support block 26, roll arms 27, a connecting pin 28, the bolt 29, and a cover 30 as shown in FIGS. 9 and 10.

The support block 26 is provided with a groove 261 in which the roll arms 27 are mounted. A pair of the roll arms 27 engage pivotally at an end thereof with the connecting pin 28 and the bead shaping rolls 3 are attached rotatably to the other ends of the roll arms 27. Opposite ends of the connecting pins 28 are in slidable engagement with the groove 261 of the support block 26 and the cover 30. The web support guide 2a is fixed to an end 262 of the support block 26 on the roll side.

The cover 30 is fixed to the open side of the support block 26. The bolt 29 threadably engages with another end 263 of the support block 26, and a tip end 291 of the bolt 29 engages with an enlarged central portion 281 of the connecting pin 28.

Since the web support guides 2a are subjected to severe conditions such as abrasion, temperature, pressure, magnetism, electric current, or the like for a long time during resistance welding operation, they must be of a material, preferably ceramic (60% $SiO_2$ and 40% $Al_2O_3$), sufficiently resistant to these severe conditions.

The angle of inclination $\theta$ of the bead shaping rolls 3 is preferably in the range 30°-60°, and 45° is an optimum angle. The bead shaping rolls 3 are preferably urged against the beads elastically displaceably by a suitable elastic member (not shown). The shaping rolls are, while not in operation, received within the support blocks 26. The shaping rolls 3 are undriven, but are driven to rotate by the strips. The bearings of the rolls 3 are forcedly cooled and lubricated by water or a water-soluble lubricant of low concentration to prevent inclusion of foreign matter such as flash, scale or the like.

The operation of the bead shaping apparatus having the above-described construction will now be described. First, the holders 18 of the predetermined size selected to the size of the steel section are attached to the vertically movable blocks 14, and the handles 141 are turned to adjust the positions of the bead shaping rolls 3. Then, the bolts 29 are rotated to be advanced to push the connecting pins 28 which advancement causes the roll arms 27 to slide within the grooves 261 of the support blocks 26 to thereby urge the shaping rolls 3 against the weld beads.

Figure 11:
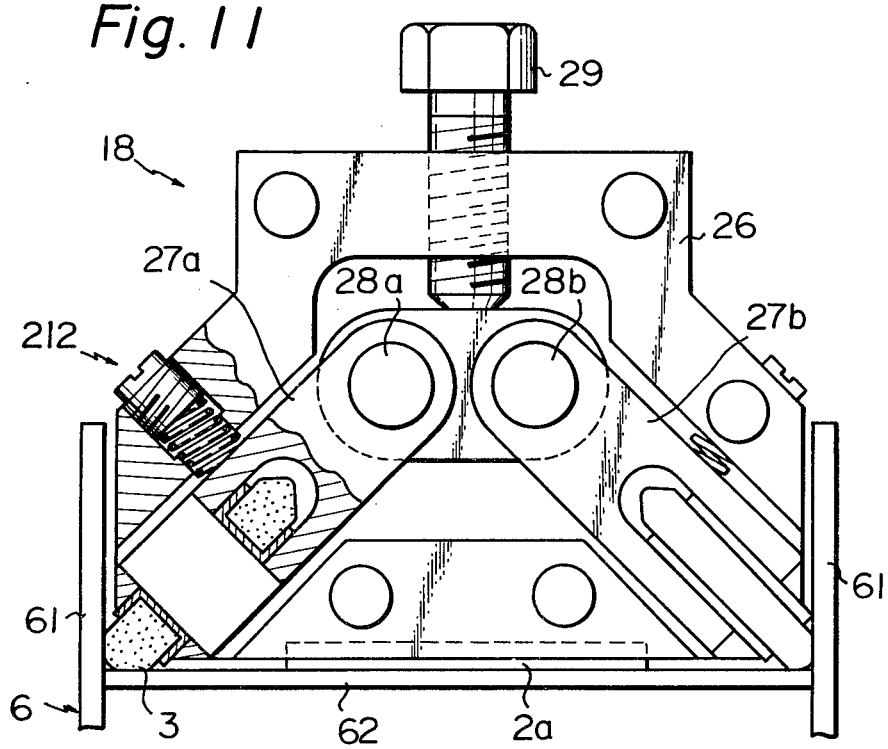
FIGS. 11 to 13 are plan views of modifications of the holder according to the present invention.
Figure 13:
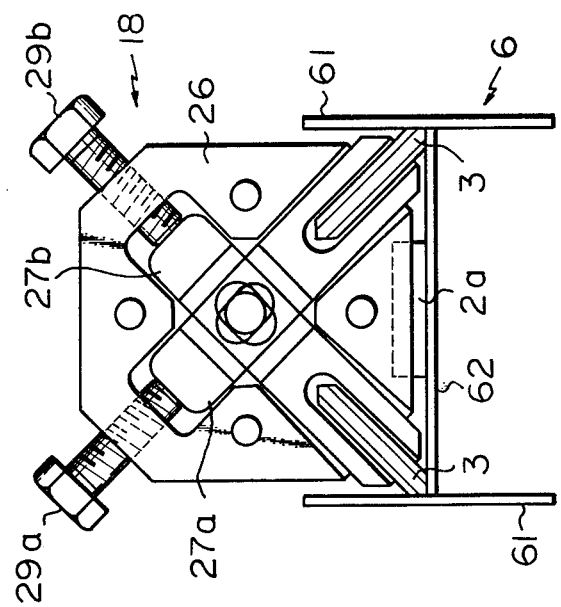
Figure 12:
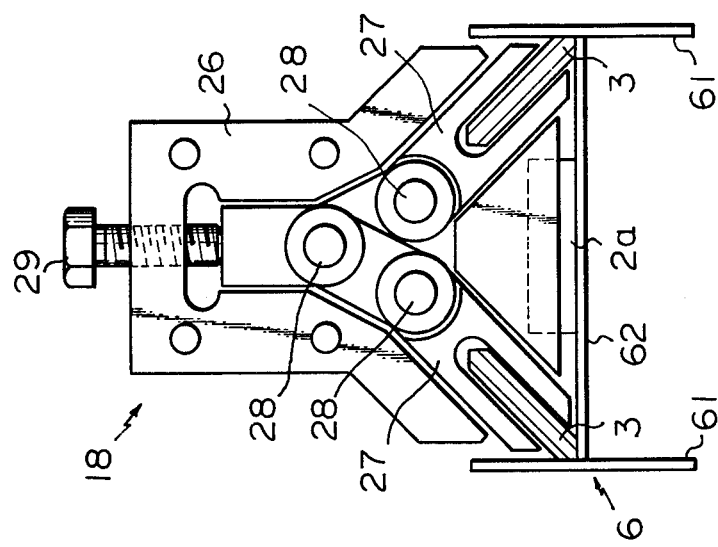

FIGS. 11 to 13 show other modifications of the holder 18. The holder 18 shown in FIG. 11 is of the construction in which roll arms 27a and 27b are supported by separate connecting pins 28a and 28b, and the roll arms 27a and 27b are finely adjusted by an elastically urging mechanism 212 during bead shaping operation.

In the construction shown in FIG. 12, three connecting pins 28 are used to connect and support the roll arms 27.

In the construction shown in FIG. 13, the roll arms 27a and 27b are urged by separate bolts 29a and 29b.

Figure 14:
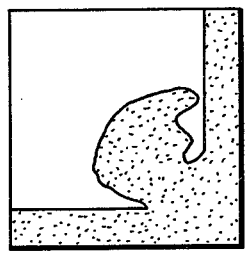
FIGS. 14A to 14C are enlarged sectional partial views showing results of shaping the weld beads by different methods.
Figure 14:
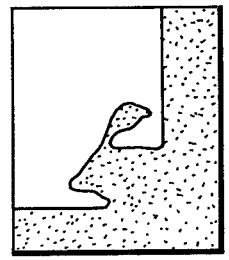
Figure 14:
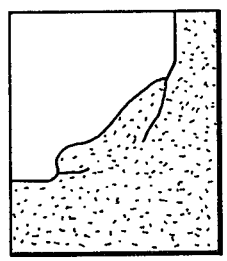

FIGS. 14A to 14C show the results of bead shaping by different methods, in which FIG. 14A shows the section of an unshaped bead for comparison, FIG. 14B shows the section of a bead shaped by a cutting tool, and FIG. 14C shows the section of a bead shaped by rolls according to the present invention. As clearly shown in FIGS. 14A to 14C, weld beads are shaped most satisfactorily by the method according to the present invention.

As described hereinabove in detail, in the weld bead shaping method according to the present invention in which the beads B still in red-hot condition after completion of welding are squeezed by the bead shaping rolls 3, the squeezed beads 3 are uniformly surfaced along the welded fillets between the web 62 and the flanges 61 into a smooth, continuous and beautiful appearance without surface flaws by chattering or extraordinary penetration of the cutting tool and, furthermore, rusting is prevented. In the bead shaping apparatus according to the present invention employing freely rotatable bead shaping rolls 3 mounted by means of the support mechanism 10 having horizontally moving function, vertically moving function, and pressure adjusting function, the bead shaping rolls 3 can be easily and rapidly moved to the most suitable positions for squeezing the projections of the weld beads B. Since the bead shaping rolls 3 are driven by movement of the H-beam 6, no particular power is required to drive them and, accordingly, the construction is simple and the costs for equipment and its maintenance are low. Other advantages provided by the present invention as compared with the shaping of beads by cutting means are that treatment of the weld beads B is not necessary, there is no cutting operation, no slag is formed, and no noise is generated to thereby increase working property and improve working environment.

While we have shown and described specific examples of practice and embodiments of our invention, it will be understood that these examples of practice and embodiments are merely for the purpose of illustration and description and that various other forms may be devised within the scope of our invention, as defined in the appended claims.

What is claimed is:

1. In an apparatus for producing steel sections by electric resistance welding, an apparatus for shaping weld beads of welded steel sections, comprising:
   (a) rotatable bead shaping rolls in a passage of the steel section formed by welding flange strips to widthwise edges of a web strip, the circumferential surfaces of the bead shaping rolls being adapted to directly contact the beads formed by the welding;
   (b) web support guides;
   (c) holders for said web support guides and said rotatable bead shaping rolls, said holders including support blocks which are provided with guide grooves in which a pair of arms are slidably mounted, the rotatable bead shaping rolls being attached rotatably to one end of a respective one of said arms, another end of said arms being pivotally attached to the support blocks by pins, at least one bolt being operatively urged against tip ends of the arms to selectively move the rotatable bead shaping rolls relative to the support blocks so as to position the rotatable bead shaping rolls such that the circumferential surfaces thereof are urged directly against the weld beads; and
   (d) a frame supporting each of said holders, said holders being vertically movable relative to a respective one of said frames.

2. The apparatus according to claim 1, wherein said rolls contact the weld beads with the plane of the rolls inclined 30°-60° with respect to the flange strip.

3. The apparatus according to claim 1, wherein said rolls are arranged in plane-symmetry to each other with respect to the web strip.

* * * * *